(12) United States Patent
Dudley

(10) Patent No.: US 11,198,459 B1
(45) Date of Patent: Dec. 14, 2021

(54) HUNTING CART

(71) Applicant: Silas Martin Dudley, Jacksonville, FL (US)

(72) Inventor: Silas Martin Dudley, Jacksonville, FL (US)

( * ) Notice: Subject to any disclaimer, the term of this patent is extended or adjusted under 35 U.S.C. 154(b) by 0 days.

(21) Appl. No.: 17/008,707

(22) Filed: Sep. 1, 2020

Related U.S. Application Data

(60) Provisional application No. 62/900,725, filed on Sep. 16, 2019.

(51) Int. Cl.
   *B62B 1/12* (2006.01)
   *B62B 5/00* (2006.01)

(52) U.S. Cl.
   CPC .............. *B62B 1/12* (2013.01); *B62B 5/0033* (2013.01); *B62B 2202/403* (2013.01); *B62B 2202/42* (2013.01)

(58) Field of Classification Search
   CPC .... B62B 1/12; B62B 1/14; B62B 1/18; B62B 1/20; B62B 1/22; B62B 5/0033; B62B 2202/42; B62B 2202/403
   See application file for complete search history.

(56) References Cited

U.S. PATENT DOCUMENTS

| | | | |
|---|---|---|---|
| 2,979,338 A | 4/1961 | Dwyer | |
| 2,992,834 A | 7/1961 | Tidwell | |
| 3,222,100 A | 12/1965 | Lindzy | |
| 4,253,677 A * | 3/1981 | Wissler | B62B 1/208 280/40 |
| 5,295,656 A | 3/1994 | Mullin | |
| 5,740,882 A | 4/1998 | Griffith | |
| 5,873,582 A * | 2/1999 | Kauffman, Jr. | B62B 1/04 280/7.12 |
| 6,139,029 A * | 10/2000 | Shaw | B62B 1/206 280/47.371 |
| 6,260,864 B1 | 7/2001 | Smith | |
| 6,283,496 B1 | 9/2001 | Dickman | |
| 6,308,968 B1 * | 10/2001 | Hollingsworth | B62B 1/206 280/47.24 |
| 6,793,236 B1 | 1/2004 | Mitchell | |
| 7,547,024 B1 | 6/2009 | Dell | |
| 7,793,744 B1 * | 9/2010 | Hardie | B62B 1/12 180/19.1 |
| 7,967,325 B1 | 6/2011 | Burton | |
| 8,141,887 B1 | 3/2012 | Poteat | |
| 8,757,638 B2 | 6/2014 | Proch | |
| 9,623,924 B2 * | 4/2017 | Huskey | B62K 27/02 |
| 10,167,007 B2 | 1/2019 | Gwennap | |
| 10,259,479 B1 | 4/2019 | Sagherian | |

(Continued)

*Primary Examiner* — John D Walters
(74) *Attorney, Agent, or Firm* — Meunier Carlin & Curfman LLC

(57) ABSTRACT

A hunting cart, consisting of features to enhance the moving of objects associated with big game hunting. The cart comprising of a body with two rotationally attached wheels and a foldable handle. The body being an assembly of two sides and their respective components laterally spaced and interconnected by way of perpendicularly mounted cross members. The result being, a cart that cuts through brush in both directions of travel while providing a low center of gravity for heavy loads such as a deer carcass, yet still provides an adequate structure to strap on and transport larger items, such as a kayak or double seated ladder stand.

24 Claims, 7 Drawing Sheets

(56) References Cited

U.S. PATENT DOCUMENTS

| | | | |
|---|---|---|---|
| 2006/0207831 A1* | 9/2006 | Moore | A01M 31/006 |
| | | | 182/20 |
| 2009/0102150 A1* | 4/2009 | Dumlao | B62B 1/10 |
| | | | 280/47.331 |
| 2010/0253023 A1 | 10/2010 | Loomans | |
| 2011/0140382 A1* | 6/2011 | Scheermesser | B62B 1/12 |
| | | | 280/47.131 |
| 2014/0083347 A1* | 3/2014 | Taylor | B63C 13/00 |
| | | | 114/263 |
| 2015/0237993 A1* | 8/2015 | Gruver | A45F 4/02 |
| | | | 224/153 |
| 2017/0325445 A1 | 11/2017 | Mitchell | |

* cited by examiner

HUNTING CART

CROSS-REFERENCE TO RELATED APPLICATIONS

This application claims the benefit of provisional patent application Ser. No. 62/900,725, filed 2019 Sep. 6 by the present inventor.

FIELD OF DISCLOSURE

This present disclosure relates to carts that are used by hunters to move harvested game and gear in and out of the woods.

BACKGROUND

Anyone who has successfully participated in the sport of big game hunting can tell you the natural high one gets from harvesting an animal can quickly be brought to a low when faced with the task of getting that animal out of the woods. Dragging anything that is heavy is exhausting! Therefore, it's no wonder we have seen many inventions over the years to aid hunters in moving harvested animals and the gear used to hunt them.

Although a study of the prior art turns up many clever inventions, most of them miss the mark in big ways, leaving something to be desired in a hunting cart. Some examples are as follows;

U.S. Pat. No. 20,100,253,023 to Loomans, shows a wedge shaped game cart that performs well at piercing through brush. However, the cart isn't easy to load or balance due to its high center of gravity and its wheels being aligned along its axis.

In U.S. Pat. No. 8,141,887 to Poteat, we see a cart that is easy to load and balance, but the design will not go through brush easily. Tires mounted outside of the frame in the manner seen in this invention create a pinch point for vines and saplings between them and the frame. Nothing is more frustrating than being jerked to a complete stop by a vine that wraps around one of your tires and gets caught on the axle!

U.S. Pat. No. 6,260,864 to Smith, shows a design that balances well, deflects brush, and is able to move a small boat. However, upon further examination, one will realize that Smith's design is not optimal in that it only deflects brush while moving in the forward direction, and moving a boat requires an optional piece being attached to the frame.

Furthermore, in U.S. Pat. No. 7,547,024 to Dell, we see a polymer sheet like apparatus for sliding animal carcasses across the ground. A low center of gravity is desirable when transporting objects through the woods, but it is doubtable as to the longevity of the polymer sheet used in achieving this goal. An invention such as this may prove useful at moving a carcass, but it is doubtable as to its ability to move any other gear associated with hunting.

Finally, in U.S. Pat. No. 6,283,496 to Dickmann, we see a cart with a split axle design, but it is done in such a way that the load will ride at a height which is greater than the diameter of the wheels. Carts with a high center of gravity are notorious for tipping over while traversing common objects encountered in the field, such as rocks and logs.

As one can see from the examples given above and from studying other prior art, there is still a need for a hunting cart designed to overcome the multiple challenges that go unaddressed by any single cart in existence today. An ideal hunting cart should be able to move a small boat, be easy to load and balance, provide for a low center of gravity, and cut through brush while traveling forward or rearward. Therefore, it is the object of this invention to provide its users with a cart to make retrieving game and packing gear an easier process.

SUMMARY

This present disclosure is directed toward a new hunting cart which gives hunters the versatility that has been lacking in similar carts from the past. An ideal hunting cart will be able to transport harvested game and the gear needed to pursue such animals in and out of the various terrain types that one finds themselves in while participating in big game hunting.

An embodiment of a new hunting cart from this disclosure will be able to move a small boat without the need for auxiliary attachments, and be able to float in the event it falls into the water.

Also, an embodiment of a hunting cart presented in this disclosure will provide for a truly low center of gravity by utilizing a split axle design.

Another aspect of a new hunting cart will provide brush deflection in both the forward and rearward directions of travel. When descending a hillside with a game cart, it is common practice for an operator to let the cart go down first whilst they follow, acting as a break. Providing for brush deflection in this rearward form of travel is critical in easing the process of transporting items through the woods.

Furthermore, another object of this disclosure is to provide a user with a cart affording the ability to quietly and securely transport large items. The ability of a user to move items such as double seated tree stands will prove to be extremely beneficial in the pursuit of big game animals.

Finally, an embodiment of a hunting cart from this disclosure will pull through the woods in a similar fashion as a sled or sheet, but give the benefits of being on wheels.

Figure 1:
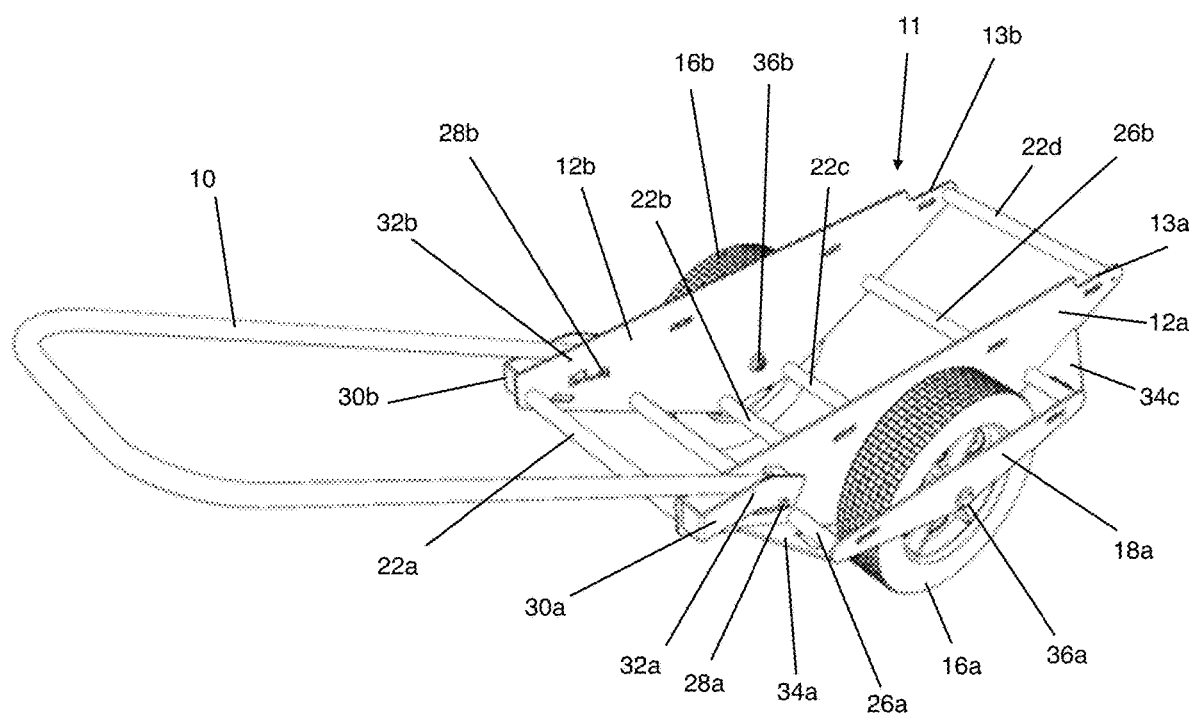
FIG. 1 is a perspective view of an embodiment of a hunting cart from this disclosure.

DRAWING REFERENCE NUMERALS 10 handle
11 body
12 frame side
13 handle notch 44 boat
14 wire hole 46 carcass
16 wheel 52 liner
18 fender 54 person
20 strapping point
22 cross member
24 wire snap
26 extended cross member 28 safety pin
30 handle guard
32 handle pivot bolt
33 handle stop
34 deflector
36 axle bolt
42 strap
44 boat
46 carcass
52 liner
54 person

DETAILED DESCRIPTION

Studying the following description and FIGS. 1-7 will allow one who is skilled in the art to construct an embodiment of a hunting cart from this present disclosure. The preferred method of construction is by way of metal pipe or tubing being used for the cross members and handle. Connecting of the cross members or handle to their respective components is achieved by way of welding or bolting, such as is commonly practiced in fabrication today. The thin components contained in the body of the cart are cut or stamped from metal in accordance with modern practices in the field. Please note the construction methods and materials presented in this disclosure are currently preferred, but multiple materials or methods may be suitable to perform the task of producing a hunting cart in accordance with the scope of this disclosure.

Figure 2:
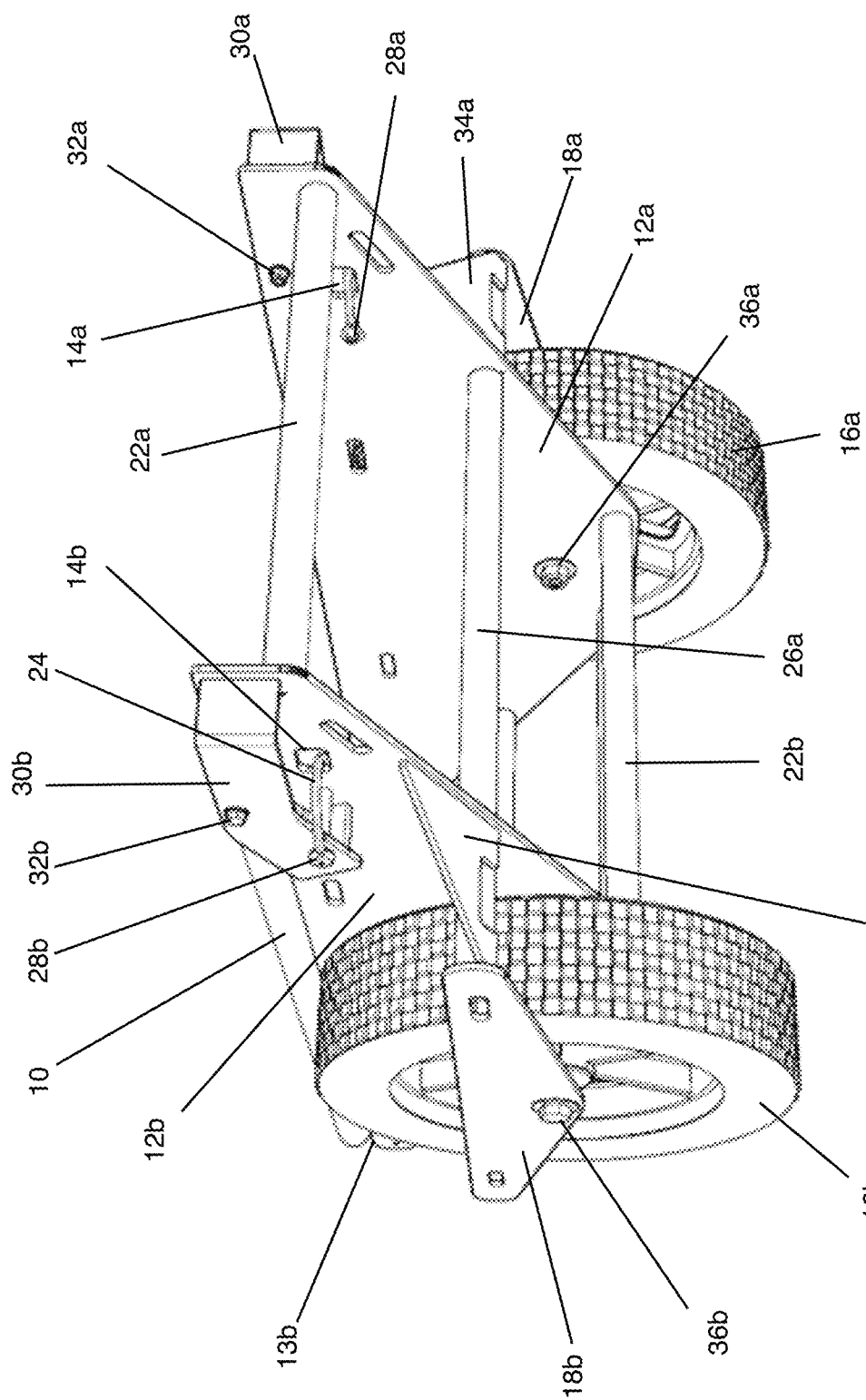
FIG. 2 is a low frontal perspective of a cart from this disclosure with its handle folded down.

FIGS. 1-2 show an embodiment of a hunting cart from this present disclosure. The body 11 consists of two frame sides 12a-b, two fenders 18a-b, two handle guards 30a-b, and four deflectors 34a-d, which are interconnected by way of four cross members 22a-d and two extended cross members 26a-b. The embodiment of a hunting cart in FIGS. 1-2 is shown with a foldable handle 10 and rotationally attached wheels 16a-b.

As seen in FIG. 1-2, the body 11 consists of vertically mounted frame sides 12a-b and fenders 18a-b. The frame sides and fenders are held in their respective locations by way of cross members 22a-d and extended cross members 26a-b. The frame sides and fenders are both shaped in a similar fashion albeit the fenders are approximately one quarter the size of the frame sides. Both components are widest at their centers, flat along their top edges, and slope along their bottom edges. Both the frame sides and fenders consist of corresponding holes in their lower center portion for the purpose of attaching wheels 16a-b. The frame sides and fenders are properly spaced in relation to one another to accommodate the width of the wheels 16 a-b, which are rotationally mounted between them. The length of the extended cross members 26a-b determines the width between the frame sides 12a-b and fenders 18a-b. This configuration provides support on both sides of the wheels 16a-b and allows for the alleviation of a single axle spanning the entire width of the cart. This split axle design allows cargo to rest on the cross members 22 b-c, which are below the elevation height of the axle bolts 36a-b, thus providing for a low center of gravity.

The embodiment of a game cart from this disclosure shown in FIGS. 1-2 consists of four cross members 22a-d and two extended cross members 26a-b. The length of the cross members determines the overall width of the cart. It is preferred to have a body 11 that is approximately the same width as a person, but any width desired is possible without deviating from the scope of this disclosure. The four cross members 22a-d are perpendicularly mounted to the insides of the frame sides 12a-b. There is one at each end and two in the lower middle portion at an elevation below the height of the axle bolts 36a-b. The extended cross members 26a-b pass through the frame sides 12a-b in the front and rear of the wheels 16a-b. Their protruding sections extend to a distance slightly larger than the width of the wheels 16a-b and attach to the ends of the fenders 18a-b.

Figure 3:
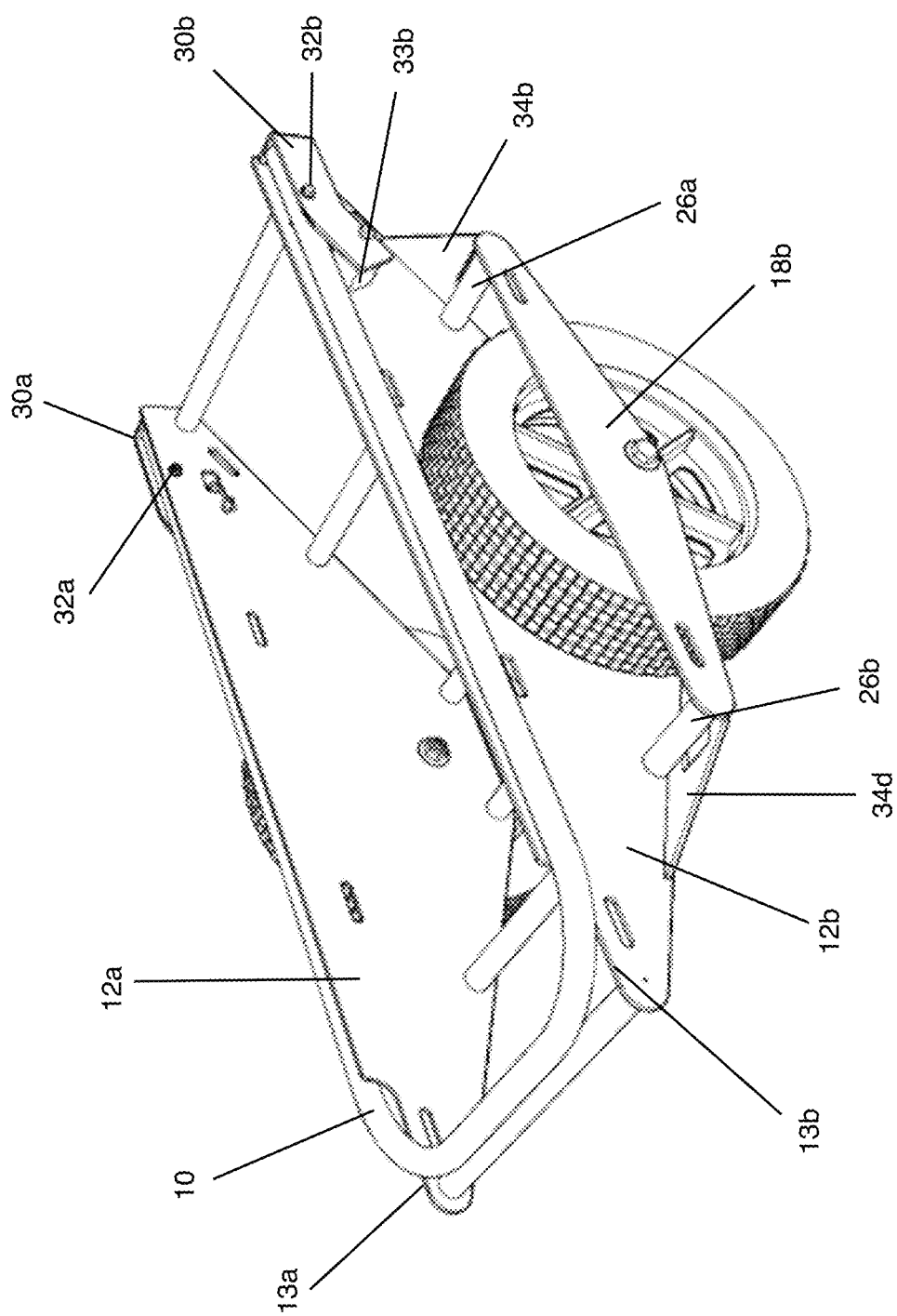
FIG. 3 is a rearward perspective of the cart from FIG. 2.
Figure 4:
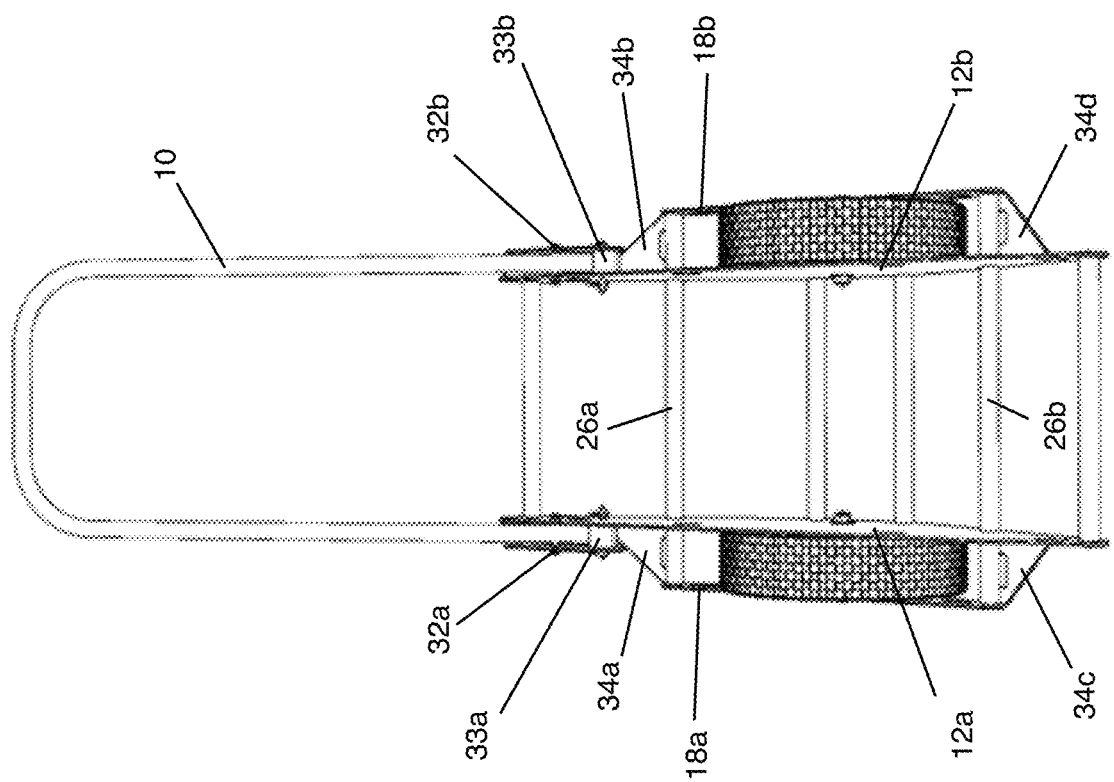
FIG. 4 shows a top view of a cart from this present disclosure.

Focusing on FIGS. 3-4, one can see an aspect of a handle 10 on an embodiment of a hunting cart from this present disclosure. A handle 10 consists of pipe or tubing which is fabricated to coordinate with the length and width of the cart. A handle 10 is connected to the body 11 by way of two handle pivot bolts 32a-b passing through corresponding holes in the frame sides 12a-b, handle guards 30a-b, and handle 10. The two ends of the handle 10 should be of sufficient length past the handle pivot bolts 32a-b to contact the handle stops 33a-b while in the opened position. When folded to the closed position, the handle 10 should rest on the handle notches 13a-b lying slightly below the top edges of the frame sides 12a-b.

As seen in FIGS. 3 and 4, handle guards 30a-b are attached to the front ends of the frame sides 12a-b. A handle guard 30 consists of a ninety-degree bend on its front portion and contains holes to aid in the mounting and operation of a handle 10. Handle stops 33a-b are attached perpendicularly between the rear portion of the handle guards 30a-b and the frame sides 12a-b.

Looking at FIGS. 2 and 4, a common safety pin 28 with a wire snap 24 is used to secure a handle in the open position. This is achieved by rotating the handle 10 into the open position (its two ends touching the handle stops 33a-b) and sliding the pin through the holes provided by the handle guards 30 and frame sides 12. The loose end of the wire snap 24 on the safety pin 28 is passed through the wire hole 14 in the frame side 12 before securing it back onto the safety pin 28.

Looking again at FIGS. 3-4, one will notice this embodiment of a hunting cart has four deflectors 34a-d, one being located forward and rearward of each of the two wheels 16a-b. Deflectors 34a-d are made from metal of sufficient rigidity to not only add structural support to the body 11, but also perform the task of deflecting vines and saplings around the cart. Deflectors 34a-d connect to the extended cross members 26 at their portions located between the frame sides 12a-b and fenders 18a-b. The deflectors 34a-b being triangular in shape are oriented so their hypotenuses angle from the ends of the fenders 18a-b back toward the end of their corresponding frame sides 12a-b.

Figure 5:
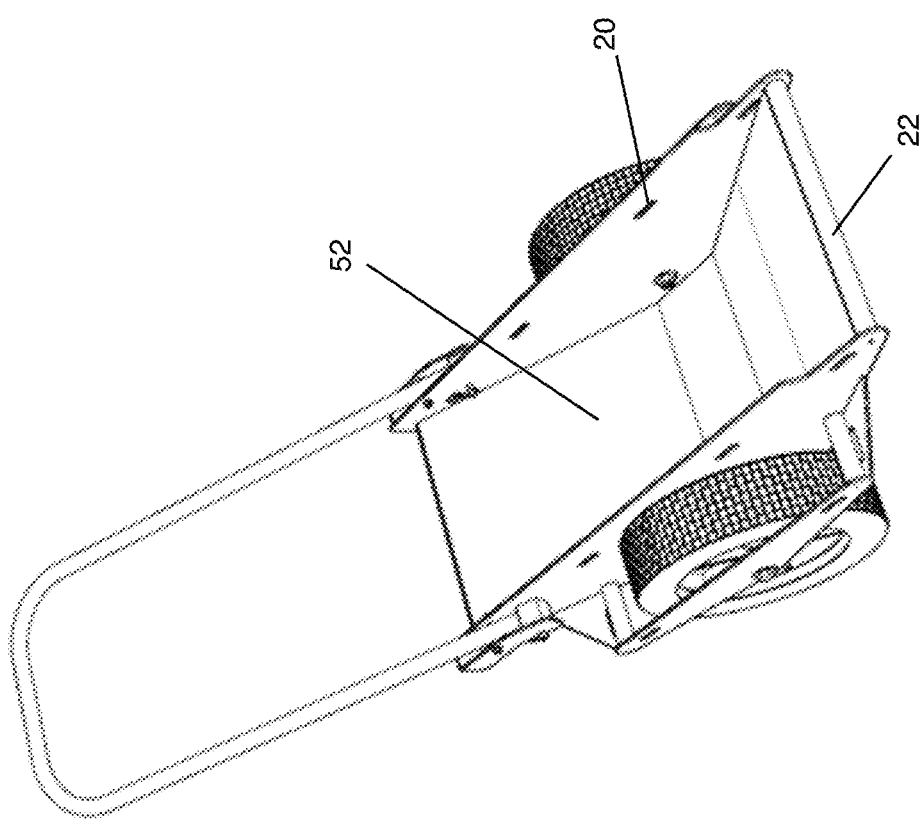
FIG. 5 is a cart from this present disclosure shown with a solid liner.
Figure 6:
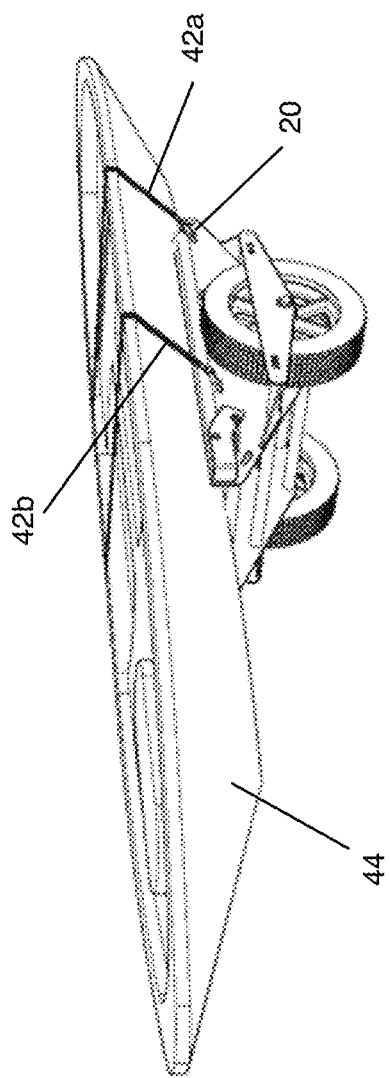
FIG. 6 shows a cart from this present disclosure with a boat strapped on it.
Figure 7:
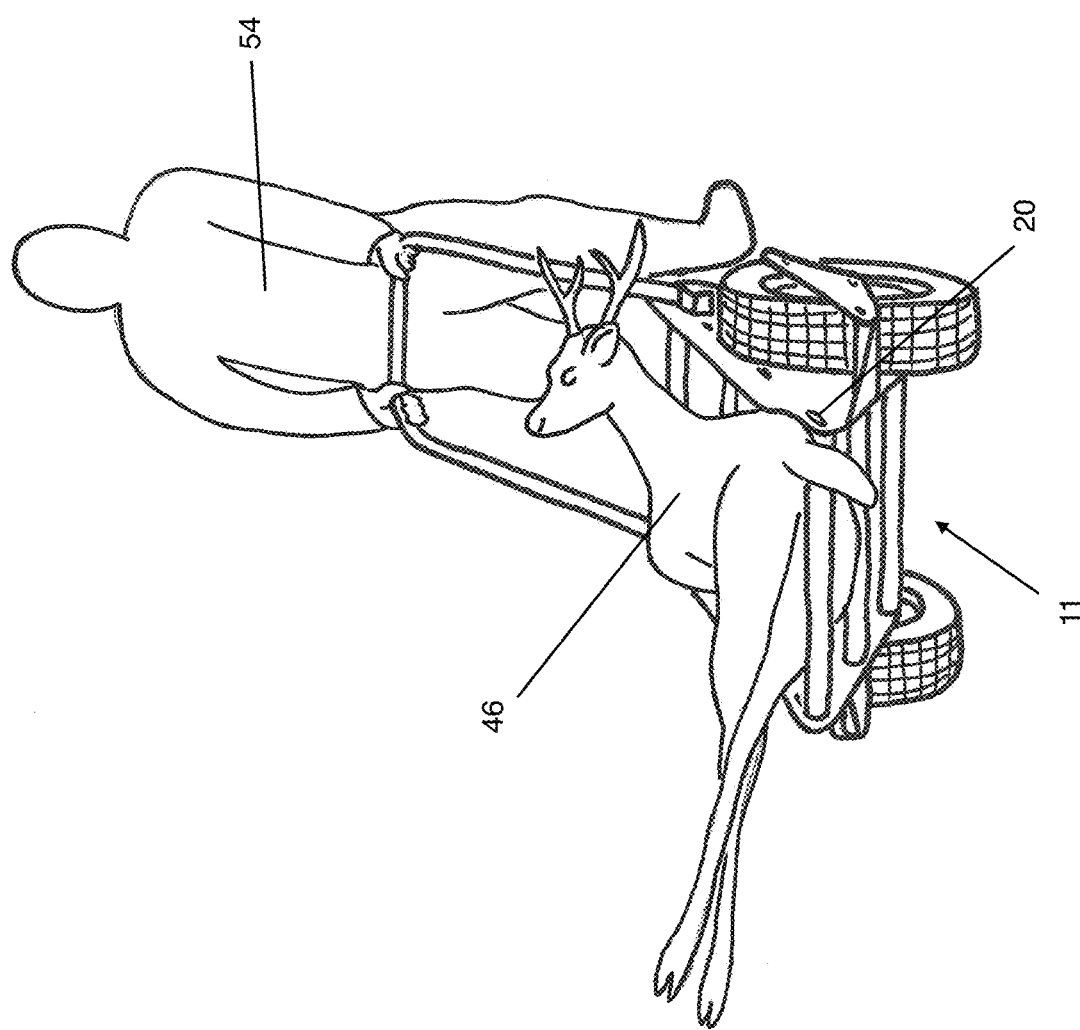
FIG. 7 is a person transporting a deer with a cart from this disclosure.

In FIGS. 5-7, multiple examples of a strapping point 20 can be seen. The embodiment of a cart from this disclosure contains sixteen strapping points 20. A strapping point 20 is constructed by cutting a groove into the metal, which is of a sufficient size, to allow a strap 42 to hook or tie to that point. Strapping points 20 can be placed in any location desired, given they do not interfere with the structural integrity of the cart.

FIG. 5 is an embodiment of a cart from this present disclosure having a liner 52 in it. If desired, hunting carts in accordance with this disclosure can be constructed to include a removable liner 52 that rests along the tops of the cross members 22a-d and extended cross members 26a-b. The liner 52 may be constructed from multiple materials such as metal, plastic, or outdoor fabrics, and rest in or fasten to the cart. It is also conceivable to construct a liner as a permanent structural part of the cart.

The wheels 16a-b in the embodiment of a cart shown in FIGS. 1-7 are preferably foam filled solid tires with enough buoyancy to keep the cart afloat in the event it falls into the water. The wheels 16a-b are sized properly to fit in the gap created by the frame sides 12a-b and the fenders 18a-b. The wheels 16a-b consist of common bushings or bearings that correspond to the diameter of the axle bolts 36a-b. The axle bolts secure the wheels to the body as well as provide an axle for them to rotate upon.

Operation FIGS. 1-7

A new hunting cart from this present disclosure is operated in a similar fashion as is common to carts in its field. When transporting larger objects associated with hunting, such as double seated tree stands or kayaks, the object would be placed onto the body 11 of the cart with the handle 10 being in the down position. The object would then be secured to the body 11 by way of straps connecting it to strapping points 20, see FIG. 6. One end of the object being transported would act as a handle for pulling the cart. When moving smaller objects such as tree stands, coolers, backpacks, or climbing sticks, the handle 10 is folded out into the open position. This is achieved by removing the safety pins 28a-b, rotating the handle into the open position, and reinserting the safety pins 28a-b. The load is then placed onto the body of the cart with care being taken to balance out the weight and keep it as low as possible. Once secured by way of straps 42 and strapping points 20, the load is moved along by way of an operators hands gripping the handle, as seen in FIG. 7.

In the event of a harvest, the handle 10 is rested on the ground near the carcass and the animal is slid onto the cross members between the frame sides 12a-b. If possible, any other gear can be loaded over top of the carcass 46 and secured with straps 42. The weight of the load should always be kept as low as possible to prevent the cart from tipping over, which often occurs due to a high center of gravity. The cart and its contents is then pulled or pushed to the desired location, see FIG. 7. The wedge shaped design of the fenders 18a-b, frame sides 12a-b, and deflectors 34a-d, allow the cart to cut through and be pulled over various obstacles and brush encountered when traversing the terrain associated with big game hunting.

CONCLUSION RAMIFICATION AND SCOPE

Accordingly, a reader can see an embodiment of a hunting cart set forth in this disclosure includes features that truly achieve results in areas other carts have failed. The split axle design and the shape of the components that achieve it provide for a truly useful hunting cart. Providing a hunting cart with a low center of gravity, brush deflection in two directions of travel, and the ability to securely transport multiple objects associated with hunting is definitely needed in the hunting community today!

Although one can see the usefulness of a hunting cart from the description of the embodiments set forth in this disclosure, it is important to remember that they not be construed as limitation to the scope of this disclosure.

For example, a handle may be constructed to allow a cart from this disclosure to be pulled by a bicycle or an ATV.

A cart from this disclosure may also include features such as scuff guards, brakes, or kickstands for leveling the cart while loading.

It is also conceivable that a cart could have custom attachments built into it, or an area for attaching them, to safely transport guns, bows, or any such thing desired.

Further, a cart from this disclosure could be constructed in such a way as to make use of electric motors for powering the wheels.

Accordingly, the scope of this disclosure should not be determined by the description of the embodiments and their illustrations, but by the appended claims and the legal equivalents thereof.

What is claimed is:

1. A hunting cart comprising:
 a first wheel and a second wheel laterally spaced apart, each of said first wheel and said second wheel being rotationally connected between a respective fender and a respective frame side,
 said respective fenders being proximally located to the exterior sides of said first and second wheels, said respective frame sides being proximally located to the interior sides of said first and second wheels,
 said respective fenders and said respective frame sides being held in their respective positions by a plurality of cross members perpendicularly mounted between them,
 a handle constructed in accordance with the length and width of said respective frame sides, said handle being pivotally attached to said respective frame sides,
 said respective frame sides and said respective fenders are wedge shaped from their centers toward both ends, the wedge shape configured to provide a user the ability to slide the hunting cart onto and off of obstacles.

2. The hunting cart of claim 1 wherein said cross members comprises a first centrally located cross member and a second centrally located cross member, said first and second centrally located cross members connect to said respective frame sides below the center height of said first and second wheels.

3. The hunting cart of claim 1 further comprising a deflector which angles from said respective fender to said respective frame side in front and behind one of said first and second wheels, said deflector being triangular in shape and of sufficient rigidity to force brush toward the outside of the hunting cart in both directions of travel.

4. The hunting cart of claim 1 wherein the said respective frame sides extend above the height of said first and second wheels thereby providing a platform to secure items above the first and second wheels.

5. The hunting cart of claim 1 wherein said first and second wheels are foam filled and sized appropriately to provide buoyancy to the hunting cart.

6. The hunting cart of claim 1 further comprising a plurality of strapping points, each of said strapping points being a groove cut into said respective frame sides and of sufficient size to allow for the hooking and tying of straps to the hunting cart.

7. A hunting cart comprising:
 a body, a handle, and a plurality of wheels,
 said body comprising vertically oriented frame sides and fenders laterally spaced apart and interconnected by a plurality of perpendicularly mounted cross members,
 said handle being mounted to said frame sides,
 said wheels being rotationally mounted to said body between said fenders and said frame sides,
 said frame sides and said fenders are wedge shaped from their centers toward both ends, the wedge shape configured to provide a user the ability to slide the hunting cart onto and off of obstacles.

8. The hunting cart of claim 7 wherein said perpendicularly mounted cross members comprises a first centrally located cross member and a second centrally located cross member, said first and second centrally located cross members connect to said frame sides below the center height of said wheels.

9. The hunting cart of claim 7 wherein the frame sides comprise a plurality of strapping points and extend above the height of the wheels, thereby allowing items to be secured to the hunting cart and extend over the wheels.

10. The hunting cart of claim 7 further comprising wedge shaped deflectors configured for pushing brush to the exterior of said body, said deflectors being mounted forward and rearward of said wheels.

11. The hunting cart of claim 7 further comprising an electric motor or motors configured to power the hunting cart.

12. A hunting cart comprising;
a body comprising a first frame side and a second frame side spaced laterally apart and vertically oriented, said first and second frame sides being wedge shaped from their centers out toward their ends,
said first and second frame sides being held in parallel relation by a plurality of perpendicularly mounted cross members, said perpendicularly mounted cross members disposed at both ends and along the lower perimeter of said first and second frame sides,
two extended cross members situated along the lower perimeter of the first and second frame sides, between the middle and the ends, extend through the first and second frame sides for attaching of a first fender and a second fender,
said first and second fenders are attached to said extended cross members in proximal locations to the exterior sides of said first and second frame sides,
a first wheel and a second wheel are rotationally mounted between said first frame side and said first fender and said second frame side and said second lender, respectively,
said first and second frame sides comprising handle guards at their ends, said handle guards being formed out of or attached to said first and second frame sides, said handle guards comprising holes corresponding to adjacent holes in said first and second frame sides, said holes allow for the pivotal attachment and operation of a handle.

13. The hunting cart of claim 12 wherein a first deflector and a second deflector are mounted forward and rearward of said first and second wheels, respectively, said first and second deflectors are triangular in shape with their hypotenuses running from the end of said first and second fenders toward the end of said first and second frame sides, said first and second deflectors being of sufficient rigidity to provide structural support to said body and direct brush out and around said first and second wheels.

14. The hunting cart of claim 12 wherein two centrally located cross members connect to said first and second frame sides below the center height of said first and second wheels.

15. The hunting cart of claim 12 wherein the said first and second frame sides extend above the height of said first and second wheels thereby providing a platform to secure items above the first and second wheels.

16. The hunting cart of claim 12 wherein said first and second wheels are foam filled and sized appropriately to provide buoyancy to the hunting cart.

17. The hunting cart of claim 12 wherein rotational force is applied to said first and second wheels by an electric motor.

18. The hunting cart of claim 12 further comprising a liner arranged between said first and second frame sides and disposed on said two extended cross members, said liner being permanently fastened or removable.

19. The hunting cart of claim 12 wherein the first and second frame sides comprise respective handle notches formed in their ends, said respective handle notches being sufficient depth to allow said handle to fold back and rest in said respective notches at a height below the top of the first and second frame sides thus allowing the top of the hunting cart to receive items without interference from the handle.

20. A hunting cart comprising:
a body, said body comprising:
a plurality of frame sides, said frame sides being laterally spaced apart,
a plurality of fenders, said fenders being laterally spaced apart, and
a plurality of cross members, said cross members being perpendicularly mounted between said frame sides and said fenders;
a handle, said handle being mounted to said frame sides; and
a plurality of wheels, each of said wheels being rotationally mounted to said body between one of said fenders and one of said frame sides, wherein said frame sides and said fenders are wedge shaped from their respective centers toward both ends.

21. The hunting cart of claim 20 wherein said cross members comprises a first centrally located cross member and a second centrally located cross member, said first and second centrally located cross members connect to said frame sides below the center height of said wheels.

22. The hunting cart of claim 20 wherein said frame sides extend above the height of said wheels.

23. The hunting cart of claim 20 wherein said wheels are foam filled.

24. The hunting cart of claim 20 further comprising a liner arranged between said frame sides and disposed on said cross members.

* * * * *